(12) United States Patent
Jang (10) Patent No.: US 11,368,758 B2
(45) Date of Patent: Jun. 21, 2022

(54) VOD SERVICE SYSTEM BASED ON AI VIDEO LEARNING PLATFORM

(71) Applicant: GDFLAB CO., LTD., Seoul (KR)

(72) Inventor: Kyoung Ik Jang, Seoul (KR)

(73) Assignee: GDFLAB CO., LTD., Seoul (KR)

( * ) Notice: Subject to any disclaimer, the term of this patent is extended or adjusted under 35 U.S.C. 154(b) by 902 days.

(21) Appl. No.: 16/076,164

(22) PCT Filed: Jun. 1, 2018

(86) PCT No.: PCT/KR2018/006330
§ 371 (c)(1),
(2) Date: Aug. 7, 2018

(87) PCT Pub. No.: WO2019/225793
PCT Pub. Date: Nov. 28, 2019

(65) Prior Publication Data
US 2021/0204029 A1 Jul. 1, 2021

(30) Foreign Application Priority Data

May 21, 2018 (KR) .................. 10-2018-0057904
May 21, 2018 (KR) .................. 10-2018-0057909
(Continued)

(51) Int. Cl.
*H04N 21/472* (2011.01)
*H04N 21/2343* (2011.01)
(Continued)

(52) U.S. Cl.
CPC ....... *H04N 21/47202* (2013.01); *G06N 20/00* (2019.01); *H04N 21/2343* (2013.01);
(Continued)

(58) Field of Classification Search
CPC ......... H04N 21/47202; H04N 21/2343; H04N 21/4667; H04N 21/4668; H04N 21/251;
(Continued)

(56) References Cited

U.S. PATENT DOCUMENTS 8,862,527 B2 * 10/2014 Garner .................. G06N 3/088
706/25
10,225,607 B1 * 3/2019 Bai ...................... H04N 21/251
(Continued)

FOREIGN PATENT DOCUMENTS

EP        3322189 A1 * 5/2018 ............. H04N 19/40
KR        10-0640122 B1   10/2006
(Continued)

OTHER PUBLICATIONS

Y. Xie, J. Xiao, T. Tillo, Y. Wei and Y. Zhao, "3D video super-resolution using fully convolutional neural networks," 2016 IEEE International Conference on Multimedia and Expo (ICME), 2016, pp. 1-6, doi: 10.1109/ICME.2016.7552931. (Year: 2016).*
(Continued)

*Primary Examiner* — Cynthia M Fogg
(74) *Attorney, Agent, or Firm* — The PL Law Group, PLLC (57) ABSTRACT

A video on demand (VOD) service system is based on an artificial intelligence (AI) video learning platform. A VOD service system based on an AI video learning platform may perform video learning according to AI-based Super Resolution Convolutional Neural Networks (SRCNNs) to calculate a weight required for restoring a high image quality video from a high image quality VOD file, and then restore a low image quality VOD file to a high image quality VOD file using the calculated weight corresponding to the VOD file later on.

6 Claims, 5 Drawing Sheets

(30) Foreign Application Priority Data

May 21, 2018 (KR) ........................ 10-2018-0057910
May 21, 2018 (KR) ........................ 10-2018-0057915

(51) Int. Cl.
    *H04N 21/25*     (2011.01)
    *H04N 21/466*     (2011.01)
    *G06N 20/00*     (2019.01)

(52) U.S. Cl.
    CPC ....... *H04N 21/251* (2013.01); *H04N 21/4667* (2013.01); *H04N 21/4668* (2013.01)

(58) Field of Classification Search
    CPC ......... H04N 21/23439; H04N 21/4666; H04N 19/40; G06N 20/00
    USPC .......................................................... 725/87
    See application file for complete search history.

(56) References Cited

U.S. PATENT DOCUMENTS

| | | | | |
|---|---|---|---|---|
| 10,701,394 | B1* | 6/2020 | Caballero | G06N 3/08 |
| 11,095,925 | B2* | 8/2021 | Jang | H04N 21/435 |
| 2008/0222120 | A1* | 9/2008 | Georgis | G06F 16/786 |
| 2017/0372505 | A1* | 12/2017 | Bhat | G06T 7/11 |
| 2018/0295320 | A1* | 10/2018 | Breternitz | G06T 3/40 |
| 2019/0075301 | A1* | 3/2019 | Chou | H04N 19/86 |
| 2019/0354837 | A1* | 11/2019 | Zhou | G06N 3/082 |
| 2019/0391878 | A1* | 12/2019 | Mark | G06F 11/3034 |
| 2020/0374573 | A1* | 11/2020 | Zhu | H04L 65/4084 |
| 2021/0058653 | A1* | 2/2021 | Jang | H04N 21/4402 |

FOREIGN PATENT DOCUMENTS

| | | |
|---|---|---|
| KR | 10-2007-0024918 A | 3/2007 |
| KR | 10-1003045 B1 | 12/2010 |
| KR | 10-2011-0022377 A | 3/2011 |
| KR | 10-20110091991 A | 8/2011 |
| KR | 10-1111121 B1 | 2/2012 |
| KR | 10-2014-0081481 A | 7/2014 |
| KR | 10-2017-0096298 A | 8/2017 |
| KR | 10-1780057 B1 | 9/2017 |
| KR | 10-1791573 B1 | 10/2017 |
| KR | 10-2018-0010892 A | 1/2018 |

OTHER PUBLICATIONS

Notice of Allowance dated Oct. 2, 2018 from Korean Patent Office in a counterpart Korean Patent Application No. 10-2018-0057904 (all the cited references are listed in this IDS.) (English translation is submitted herewith).

Notice of Allowance dated Oct. 2, 2018 from Korean Patent Office in a counterpart Korean Patent Application No. 10-2018-0057909 (all the cited references are listed in this IDS.) (English translation is submitted herewith).

\* cited by examiner

VOD SERVICE SYSTEM BASED ON AI VIDEO LEARNING PLATFORM

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/006330, filed Jun. 1, 2018, which claims priority to the benefit of Korean Patent Application No. 10-2018-0057904 filed on May 21, 2018, 10-2018-0057909 filed on May 21, 2018, 10-2018-0057910 filed on May 21, 2018 and 10-2018-0057915 filed on May 21, 2018 in the Korean Intellectual Property Office, the entire contents of which are incorporated herein by reference.

TECHNICAL FIELD

The present invention relates to a video on demand (VOD) service system based on an artificial intelligence (AI) video learning platform. More specifically, the present invention relates to a VOD service system based on an AI video learning platform, which may perform video learning according to AI-based Super Resolution Convolutional Neural Networks (SRCNNs) to calculate a weight required for restoring a high image quality video from a high image quality VOD file, and then restore a low image quality VOD file to a high image quality VOD file using the calculated weight corresponding to the VOD file later on.

BACKGROUND ART

A penetration rate of smart devices is increasing more and more all over the world. In particular, the penetration rate of smartphones in Korea is 91%, which is the number one ranking among 56 countries in the world. The number of people watching moving videos on a mobile device is also continually increasing. In a case of Korea, mobile video traffic in 2017 is increased to 74% or more compared to 58% in 2016.

In recent years, the use of artificial intelligence techniques in mobile devices has been actively researched and developed. In particular, performance of mobile devices that can use the artificial intelligence techniques has been dramatically developed beginning in 2015. AI open sources, which are provided by global corporations such as Google, Facebook, Apple, and the like, have begun to support mobile devices, thereby enabling the use of artificial intelligence techniques in the mobile devices in various ways.

Meanwhile, in order to provide adaptive streaming in accordance with environments of users, the existing VOD service needs to prepare video formats for each of a plurality of bitrates (270p, 360p, 480p, 720p, 1080p, and the like), each terminal and each browser. As a result, encoding costs and traffic costs are generated for a content provider who provides a VOD service, which results in a burden on charges of the users.

A size of the moving video growing year by year is a burden on communication charges for a viewer who watches a VOD on the mobile device ('mobile VOD viewer'), which results in a burden on costs of the viewer. Therefore, the VOD service is not connected to a profit of the provider who provides a high image quality VOD service. As a result, there is a demand for a method of reducing the burden on communication capacities experienced by the user and providing the moving video by the high image quality VOD file.

Meanwhile, as a prior art related to an improvement of resolution of the moving video, there is a technique disclosed in Korean Patent Laid-Open Publication No. 10-2014-0081481 (entitled a method and an apparatus for super-resolution video restoration using block-based image matching).

SUMMARY

It is an object of the present invention to provide a VOD service system based on an AI video learning platform, which allows to develop an artificial intelligence VOD player capable of reproducing a high-resolution video on a multi-platform and a multi-browser by only a low-resolution video file using an artificial intelligence learning algorithm for restoring a low-resolution video to a high-resolution video, and develop a VOD file for a mobile device for supporting the artificial intelligence VOD player.

To achieve the above-described object, according to an aspect of the present invention, there is provided a VOD service system based on an AI video learning platform, the system including: a first server configured to store a VOD file and provide a transmission service of the VOD file according to a request from a user device; a second server configured to receive the VOD file from the first server to perform AI video learning on an individual VOD file, calculate a weight corresponding to the individual VOD file as a result of the AI video learning, and transmit the calculated weight corresponding to the VOD file, which is requested in response to a transmission request for the VOD file generated from the user device, to the user device; a database (DB) configured to store an ID of the VOD file learned by the second server and the weight calculated as a result of the AI video learning for the VOD file; and the user device configured to request transmission of a video file to the first server, receive the video file from the first server, receive the weight corresponding to the video file requested to be transmitted from the second server, and execute the video file to which the weight is applied.

The VOD service system of the present invention allows a mobile VOD viewer to enjoy a high-resolution video with lower communication costs than the existing VOD service system.

In addition, according to the VOD service system of the present invention, a high-resolution video may be reproduced only by communication over a relatively short period of time, such that a high image quality video may be reproduced even in a foreign country where a network infrastructure is poor.

Further, the AI learning platform and the high-resolution video reproducing technique according to the embodiment of the present invention may be applied to various business models. Thereby, high-resolution videos may be provided in various industrial fields related to the video such as IPTV, VOD, CCTV and the like.

Furthermore, the present invention can provide an AI learning platform that may be used in all industrial fields including an artificial intelligence image processing service specializing in a specific area previously provided through learning by highly developing a video reproducing technique.

DETAILED DESCRIPTION

The present invention may be altered in various ways and have various embodiments, and will be described with reference to the drawings for illustrating specific embodiments.

However, the present invention is not limited to the specific embodiments, and it will be understood by those skilled in the art that the present invention is to cover all modifications, equivalents, and alternatives falling within the spirit and scope of the present invention. Referring to the drawings, wherein like reference characters designate like or corresponding parts throughout the several views.

It will be understood that when a component is referred to as being "connected to" or "coupled to" another component, it can be directly connected or coupled to the other component intervening another component may be present. In contrast, when a component is referred to as being "directly connected to" or "directly coupled to" another component, there is no intervening component present.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
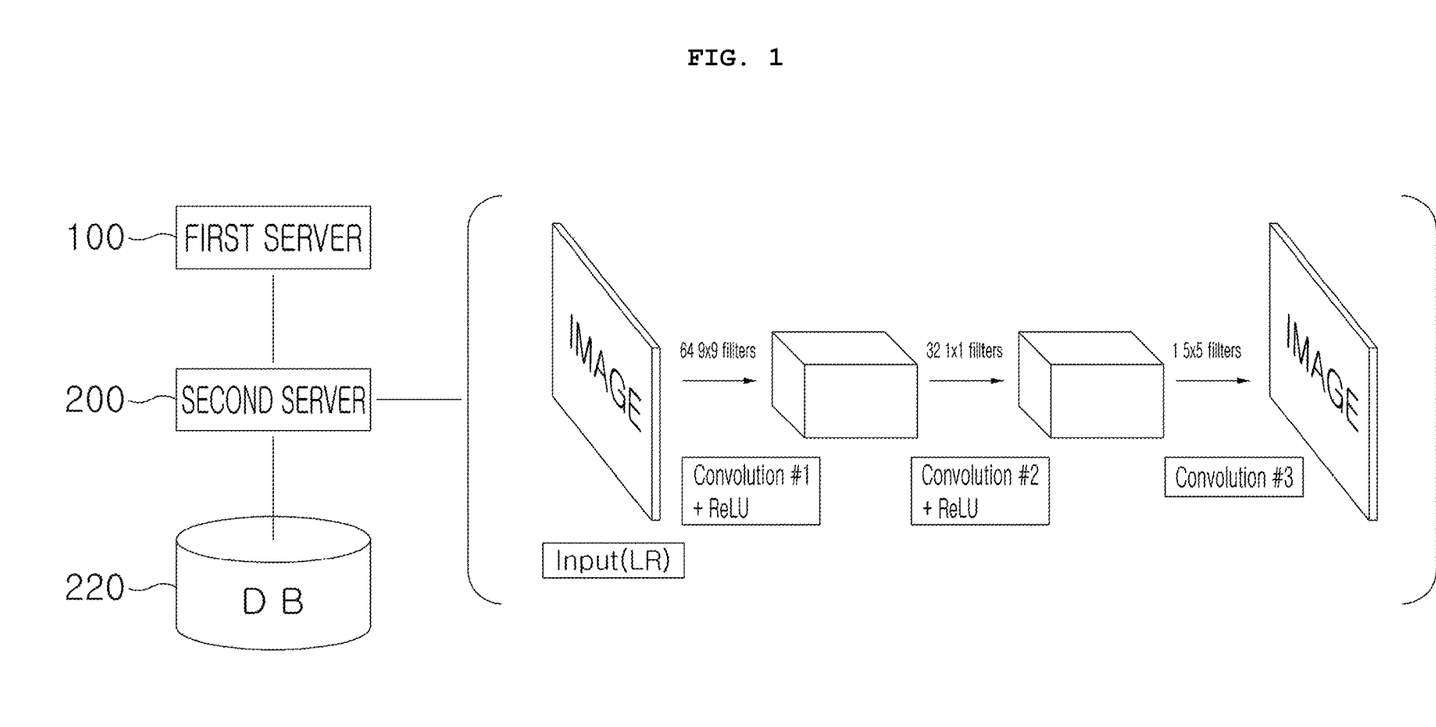
FIGS. 1 and 2 are schematic diagrams illustrating a configuration of a VOD service system according to an embodiment of the present invention.
Figure 2:
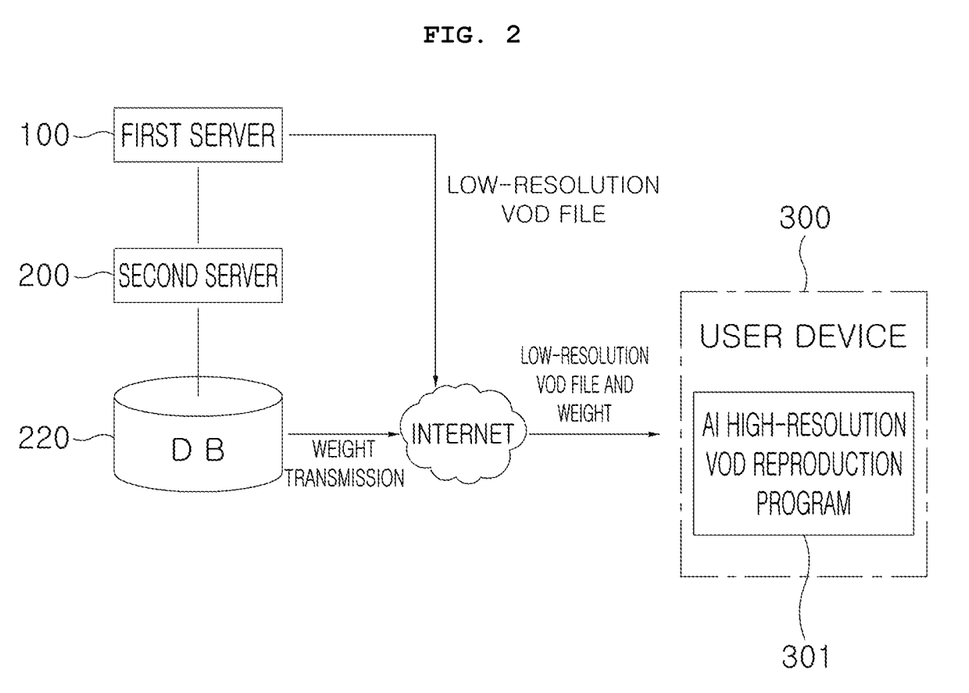

FIGS. 1 and 2 are schematic diagrams illustrating a configuration of a VOD service system according to an embodiment of the present invention.

Referring to FIG. 1, the VOD service system according to the embodiment of the present invention may include a first server 100, a second server 200, and a database (DB) 220 operating in conjunction with the second server. Based on these components, the VOD service system may perform AI video learning. Herein, the term 'AI video learning' may refer to an operation that calculates a weight (weight parameter) required for restoring a high-resolution video from a low-resolution video on the basis of SRCNN-based high-resolution video restoration techniques.

First, the first server 100 may refer to a typical VOD providing server. Although not illustrated in the drawings, the first server 100 may include a separate DB for storing VOD files. The first server 100 may transmit the VOD files stored in the DB to user devices.

The second server 200 may refer to a server that performs the AI video learning according to the embodiment of the present invention. At this time, the second server 200 may perform the AI video learning on the VOD files already uploaded in the first server 100. In addition, the second server 200 may separately store the weight generated as a result of performing the AI video learning in the DB 220 operating in conjunction with the second server. At this time, the generated weight may be stored in the DB together with an ID of the VOD file. Thereby, when the first server 100 receives a request for transmission (e.g., streaming) of a specific VOD file later on, ID information of the VOD file is transmitted to the second server 200. The second server 200 may detect the weight corresponding to the ID and may provide the VOD file having the ID to the user device.

At this time, the second server 200 may set a capacity of the weight to be calculated so as to be a preset size or less (e.g., 10 Mb or less) upon performing the AI video learning.

Referring to a right side of the second server 200 in FIG. 1, an example of an operation of the AI video learning performed in the second server 200 is schematically illustrated. The AI video learning performed by the second server 200 will be briefly described below.

The AI video learning performed by the second server 200 according to the embodiment of the present invention is an operation that calculates a weight required for restoring a low-resolution video to a high-resolution video by using a deep learning algorithm (e.g., Super Resolution Convolutional Neural Networks (SRCNNs)). The weight extracted as described above may be a weight parameter which is used when converting a low-resolution VOD file into a high-resolution VOD file through an artificial intelligence test process in the user device 300 later on (herein, a learning process may be performed in the second server, and the test process may be performed in the user device).

A basic operation of Convolution Neural Networks (CNNs) uses a method for scanning an area of a portion of a single image one by one through a filter, and performing learning while searching a value for the image. At this time, a goal of the CNNs is to find a filter having an appropriate weight value.

The DB 220 may store the weight, which is a learning result of an individual VOD file, for each ID of the VOD file.

The weight stored in the DB 220 may be specified for each ID of a VOD file ('VOD ID') as shown in Table 1 below, for example. In Table 1, a Learning Weight column may include information on an improvement degree of image resolution (e.g., improving an image resolution from 480p to 720p), together with the weights (weight parameters) required for restoring the image resolution on the user device.

TABLE 1

| VOD ID | Learning Weight |
| --- | --- |
| A000001 | 480p→720p |
| A000002 | 720p→1080p |
| A000003 | 1080p→UHD |
| ... | ... |
| Z025432 | 1080p→UHD |

According to various embodiments of the present invention, the VOD IDs stored in the DB 220 may be assigned based on content-related information such as content items (e.g., movie, music video, drama, etc.), reproduction time, plot, characters, etc.), the number of the times of reproduction and the like. For example, a method of assigning the IDs may be determined in such a way that a movie-related VOD starts by A as an ID and the drama-related VOD starts by B as another ID.

The operation of AI video learning performed in the second server 200 has been described with reference to FIG.

1. Hereinafter, an operation of providing high image quality VOD performed by the user device will be described with reference to FIG. 2.

Referring to FIG. 2, the first server 100, the second server 200 and the DB 220, which are basic components included in the VOD service system according to the embodiment of the present invention, are illustrated, and a user device 300 is further illustrated in addition thereto. As described in FIG. 1, the first server 100 may refer to a server that transmits (including streaming) the VOD files in a conventional typical method. When receiving a request for transmission of any VOD file from the user device 300, the first server 100 may transmit the VOD file to the user device 300 through wireless communication. At this time, the VOD file transmitted from the first server 100 to the user device 300 may be a VOD file having a resolution of a reference value or less.

The second server 200 may be controlled so as to receive information on the specific VOD file transmitted from the first server 100 to the user device 300, search for weight information corresponding to the specific VOD file in the DB 220, and then transmit the searched weight information to the user device 300. Alternatively, the second server 200 may directly receive a VOD file request signal from the user device 300 together with the first server 100, search for weight information corresponding to the requested VOD file, and provide the searched weight information to the user device 300.

That is, the first server 100 may transmit a VOD file (hereinafter, the VOD file received from the first server is referred to as a 'first VOD file') to the user device 300 through the Internet, and the second server 200 may transmit the searched weight information in the DB 220 operated in conjunction therewith to the user device 300 through the Internet.

Accordingly, the user device 300 may receive both a low-resolution VOD file and the weight to reproduce a high-resolution VOD file (hereinafter, the high-resolution VOD file restored on the user device 300 is referred to as 'a second VOD file') by an AI high-resolution VOD reproduction program 301 stored and installed in the user device 300.

The user device 300 reproduces the first VOD file received from the first server by the AI high-resolution VOD reproduction program 301. At this time, the AI high-resolution VOD reproduction program 301 determines whether the weight information corresponding to the program exists in the user device 300 (or whether it is streamed from the second server 200). If it is determined that the corresponding weight information exists, the second VOD (high-resolution VOD) file may be generated using an original VOD file and the weight. The AI high-resolution VOD reproduction program 301 allows the VOD service system to reproduce and play the second VOD file by converting it into an HD video if the original VOD file is an SD video, and converting it into a FHD video if the original VOD file is an HD video. Furthermore, the AI high-resolution VOD reproduction program 301 allows the VOD service system to restore the SD video to the FHD video according to types of the weight information. At this time, the resolution (size) of the second VOD file to be restored may be determined based on size information (e.g., data described in the 'Learning Weight' column of Table 1) included in the weight information.

Figure 3:
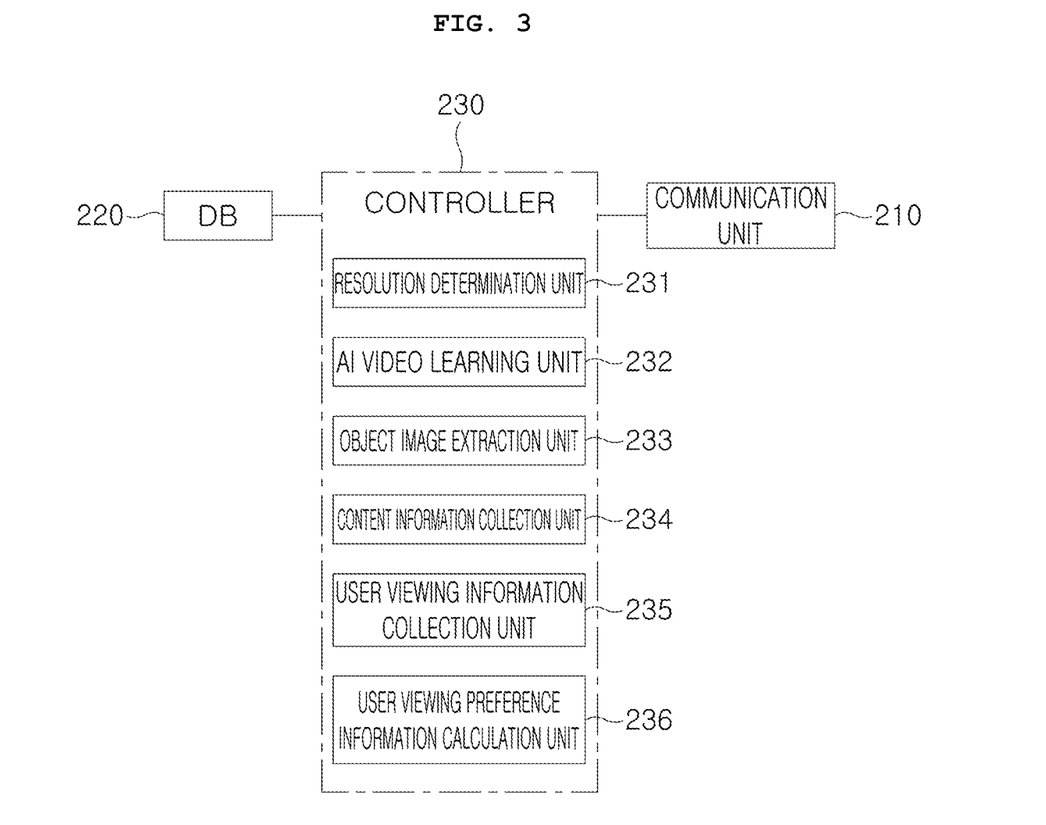
FIG. 3 is a block diagram illustrating a configuration of a second server according to the embodiment of the present invention.

FIG. 3 is a block diagram illustrating a configuration of the second server according to the embodiment of the present invention.

In FIG. 3, the second server may include a communication unit 210, the DB 220, and a controller 230. The controller 230 may include a resolution determination unit 231, an AI video learning unit 232, an object image extraction unit 233, a content information collection unit 234, a user viewing information collection unit 235, and a user viewing preference information calculation unit 236.

The communication unit 210 may use a network for transmitting and receiving data between the user device and the first and second servers, and types of the network is not particularly limited. The network may be, for example, an Internet Protocol (IP) network that provides transmission and reception services of large capacity data through an Internet Protocol (IP), or an All IP network in which IP networks different from each other are integrated. Further, the network may be a mobile communication network including a wired network, a wireless broadband (Wibro) network, a mobile communication network including a wideband code division multiple access (WCDMA) network, a mobile communication network including a high speed downlink packet access (HSDPA) network and a long term evolution (LTE) network, a mobile communication network including LTE advanced (LTE-A) and five generation (5G), a satellite communication network, and a Wi-Fi network, or a combination of at least one thereof.

The communication unit 210 according to the embodiment of the present invention may receive a request signal so as to search for a weight corresponding to the specific VOD file from the user device 300 or the first server 100 and transmit the searched weight to the user device 300. Further, the communication unit 210 may transmit the weight corresponding to the requested VOD file to the user device 300. Furthermore, the communication unit 210 may collect user private information, content information related to the VOD file, and the like from the first server, the user device, and other web servers.

The DB 220 is a device in which the weight information calculated in the second server 200 is stored by operating in conjunction with the second server 200. According to various embodiments of the present invention, the DB 220 may be configured separately from the second server 200, and may receive and store the weight information transmitted from the second server 200 through wired/wireless communication.

The DB 220 may store the weight information for each VOD file. The weight information may include weights which are weight parameters required for converting a low image quality video into a high image quality video according to an AI-based image processing operation, and final resolution information (e.g., HD-UHD; information that means a correction of resolution from HD to UHD), which may be stored in the DB 220 together therewith.

As described above, the controller 230 may include the resolution determination unit 231, the AI video learning unit 232, the object image extraction unit 233, the content information collection unit 234, the user viewing information collection unit 235, and the user viewing preference information calculation unit 236.

The controller 230 may calculate a weight which is information so as to allow a low-resolution video to be restored to a high-resolution video by using a deep learning algorithm called Super Resolution Convolutional Neural Networks (hereinafter SRCNNs) for a moving video file obtained from the first server 100. Further, the controller 230 may perform functions of collecting information on user's viewing information and VOD moving video information obtained from the first server 100, classifying the collected information according to a certain reference, and providing the VODs in accordance with user characteristics (e.g., recommending the VODs for each user's interest).

More specifically, the controller 230 may calculate weight information required for restoring a low image quality file to a high image quality file through the resolution determination unit 231, the AI video learning unit 232, and the object image extraction unit 233, and may provide a VOD service in accordance with the user characteristics through the content information collection unit 234, the user viewing information collection unit 235, and the user viewing preference information calculation unit 236.

In this regard, the resolution determination unit 231 may determine whether the resolution of the VOD file obtained from the first server 100 is a resolution of a preset level or more. According to resolution determination results, the AI video learning unit 232 may determine a video learning method for the obtained VOD file. First, if it is determined that the resolution of the first VOD file is a high-resolution video having the preset level or more as a result of resolution determination thereof by the resolution determining unit 231, the AI video learning unit 232 may extract a low-resolution video based on the first VOD file, and may perform AI video learning (e.g., SRCNN) using patches of the extracted low-resolution video and high-resolution video. At this time, the AI video learning unit 232 calculates weight information which is information required for implementing a high-resolution video from the low-resolution video as a result of the video learning. Furthermore, the AI video learning unit 232 may be controlled so as to separately store the calculated weight information in the DB 220 together with the ID information of the VOD file.

Next, if it is determined that the resolution of the first VOD file obtained from the first server 100 is a low image quality video having less than the preset level, the AI video learning unit 232 may calculate the weight by performing AI learning based on a plurality of images extracted from the VOD file. At this time, all of the plurality of images extracted from the first VOD file are low image quality video images having less than a preset resolution, and the AI video learning unit 232 may calculate the weight that can improve the resolution of the first VOD file by using self-similarity of the plurality of extracted low image quality video images. In this case, the AI video learning unit 232 may perform AI video learning in a method other than SRCNN according to various embodiments of the present invention to calculate the weight based on the AI video learning.

A resolution determination operation of the resolution determination unit 231 will not be illustrated and described, but a video learning method of the same method as each other may be performed for all the VOD files in a lump.

The AI video learning unit 232 is characterized by performing the AI video learning according to the SRCNN method, but it is not limited thereto. According to various embodiments of the present invention, the AI video learning unit 232 may perform the AI video learning according to other methods (e.g., very-deep super resolution (VDSR), deeply-recursive convolutional networks (DRCNs)) to calculate weight information for each VOD file.

When extracting the weight from the first VOD file, if a size of an entire image is the preset level or more, or a capacity of the weight is a preset capacity level or more, the object image extraction unit 233 may selectively sample only a part of the images included in the first VOD file. A part of the images sampled by the object image extraction unit 233 may correspond to an image of a central area except edge portions, for example. Further, the object image extraction unit 233 may separately perform sampling (e.g., object image sampling) on an area in which a preset object (e.g., a portrait face) of the images included in the first VOD file is detected. From the sampling image extracted by the object image extraction unit 233, the weight for an object image may be calculated through the AI video learning performed in the AI video learning unit 232. When requesting correction of the object-focused resolution from the user device 300, the weight for the object image may be provided. The weight for the object image may be used to restore only the resolution of a preset area (an area sampled as the object image) among the image areas of the entire VOD file. Since the weight for the object image is a value which is applied only to a part of the image rather than the entire image, the size of weight capacity may be reduced, and resources and time required for restoring the resolution of the video may be saved.

In one embodiment of the present invention, when providing resolution correction using an object-focused weight according to the above-described embodiment, the user device 300 may perform a request for object-based weight search and resolution correction.

For example, if there is no information on the video file to be reproduced by the user device 300, the user device 300 cannot obtain the weight of the video file, and therefore it may be difficult to perform the resolution correction. For example, the video file may be a moving video program without a title (or ID), or a clip video obtained by editing a partial scene of a movie.

In this case, the user device 300 may extract one or more objects from the video file to identify the extracted objects. The previously learned model may be used for identification of the object, and learning of the model may be performed in advance in the user device 300 or at least one server of the first and second servers. For example, the user device 300 may identify and recognize a specific object such as a character, an actor, a building, and a small object appearing in the video file, and may search for and obtain types of the video and a scene of the video corresponding thereto.

The user device 300 obtains the weight from the user device 300 or the second server 200 based on the obtained information. According to the embodiment of the present invention, when there is no weight corresponding to the video file, the user device 300 may search for a high image quality video corresponding to the video file in the server, and perform AI video learning for obtaining a weight using the searched high image quality video. Learning for obtaining a weight takes time. Therefore, the user device 300 may perform the above-described operation in a background for one or more video files stored in a play list to be streamed of the user or stored in the user device 300, and may execute learning through the server in advance before viewing by the user. When the learning is completed, the user device 300 may obtain and store the weight.

As another example, when the weight corresponding to the video file to be reproduced by the user device 300 is not stored in the user device 300 or the second server 200, the user device 300 may perform object-based resolution restoration without a separate learning procedure.

For example, the user device 300 may extract one or more objects from the video file and identify the extracted objects according to the above-described method. For example, the user device 300 may identify and recognize a specific object such as a character, an actor, a building, and a small object appearing in the video file, and may obtain a weight for the object image corresponding thereto from the user device 300 or the second server 200. For example, even if a weight for a particular movie is not stored, a weight for an actor featuring in the movie may already be stored. In this case, the user device 300 may obtain a weight for the actor, and may perform the resolution restoration for the actor's image based on the obtained weight.

In addition, the object may include a typical object that is not specified. For example, objects such as a sidewalk block, a telephone pole, a building, an automobile, and the like are not specified, and weights classified according to a predetermined reference may be stored in advance. Accordingly, when it is identified that the typical object such as a roadway, a building, an automobile, and the like is included in the video, the user device 300 may obtain the weight corresponding thereto and then perform the resolution restoration for each typical object, thereby improving the entire quality of the video.

The content information collection unit 234 may collect VOD file-focused content information which is provided from the first server 100 and has a history of performing the AI video learning. The term 'content information' refers to information required for classifying the VOD file for each item. For example, the content information may include a content type (e.g., movie, drama, M/V, entertainment, or animation, etc.), a title (e.g., Manager Kim (a title of a drama), Deadpool (a title of a movie), season and round, plot, characters and the like.

According to various embodiments of the present invention, the content information collection unit 234 may be controlled so as to collect content information on a content (content information on a VOD file having many views) of which the weight is frequently requested from the users, thereby allowing the user to determine attributes of the mainly requested contents later on. The content information collection unit 234 may collect internal content information such as a title and a round included in the first VOD file. In addition, the content information collection unit 234 may further collect external content information such as a plot, characters, and the like of the content based on the internal content information included in the first VOD file.

Furthermore, the content information collection unit 234 may control an operation of the AI video learning unit 232 based on the content information collected according to various embodiments of the present invention. For example, when there are 20 VODs classified as 'Drama/Manager Kim/1 round' (e.g., in a case of a content having a total of 1 hour, there may be many video clips divided into 5 minutes), the 20 VODs may be classified into one bundle. In addition, during the AI video learning operation for weight calculation of any content among 20 contents, the AI video learning unit 232 may perform the video learning with reference to VODs holding a similar thumbnail image among the contents classified in the same bundle based on the content information.

The user viewing information collection unit 235 may collect information based on a VOD request signal received from the user device 300. Further, the user viewing information collection unit 235 may also collect viewing information (e.g., information on the view count) of the user from the first server 100. The user viewing information collection unit 235 may collect user information (e.g., gender, age group, country, etc.) from a user account. Further, the user viewing information collection unit 235 may collect information related to the number of accesses for each user account (e.g., the average number of accesses per month), information on the ID of the viewing VOD, or classification item (e.g., the information may be recorded in a viewing VOD list form for each user) and the like. According to various embodiments of the present invention, the user viewing information collection unit 235 may further collect the average number of times of repeated reproduction of the same VOD content, main resolution selection information and the like.

The user viewing preference information calculation unit 236 may calculate information related to a user's VOD preference based on the information collected by the content information collection unit 234 and the user viewing information collection unit 235. The user viewing preference information calculation unit 236 may calculate, for example, viewing preference information on a user who has a preset reference value (e.g., three times per week) or more in the number of viewing times for any VOD or the number of accesses to the first server 100 (a VOD service web page or an application). Alternatively, the user viewing preference information calculation unit 236 may calculate the viewing preference information based on the VOD file having the viewing history for all users and the content information related to the VOD file. Alternatively, the user viewing preference information calculation unit 236 may calculate the viewing preference information for each specific age group or gender based on the user information.

In addition, the user viewing preference information calculation unit 236 may use the viewing information collected from the user viewing information collection unit 235 in order to determine an interest VOD for each user. The user viewing preference information calculation unit 236 may calculate characteristics of the VOD file preferred by the user based on the viewing information such as viewing VOD file lists for each user. At this time, the user viewing preference information calculation unit 236 may classify the information on each of the viewing VOD files of the users according to the content information, and then may determine that the information of the viewed item having the preset number of times (or rate) or more belongs to the content classification preferred by the user. For example, the user viewing preference information calculation unit 236 may assign an identification value for the classification item to each of the viewing VOD lists of the users.

Thereafter, the user viewing preference information calculation unit 236 may determine preferred VOD item information of the user based on identification value information assigned to a viewing VOD list of a specific user. For example, when it is determined that a value having a preset rate or more among the identification values assigned to the viewing VOD list of any user A corresponds to a drama (type) and a mystery (genre), the user viewing preference information calculation unit 236 may determine that the user A has a preference of (1) drama and (2) drama mystery. Next, the user viewing preference information calculation unit 236 may provide recommendation information to the first server so as to recommend VODs classified as the mystery and drama to the user A. Accordingly, upon accessing of the user A, when there is a mystery drama among the newly updated VOD files, the first server may display a screen for recommending the mystery drama VOD on an accessing page screen to the user, or may transmit update information to the user device 300 by push notification.

In addition, if a VOD (e.g., series) determined by a plurality of users to be preferred is updated in the first server 100, the user viewing preference information calculation unit 236 may be controlled so as to preferentially obtain the VOD from the second server to perform the AI video learning. That is, when determining a priority for the AI video learning of the first VOD file obtained from the first server 100, the controller 230 may determine a ranking based on user viewing preference information calculated by the user viewing preference information calculation unit 236.

According to various embodiments of the present invention, when setting the priority for the AI video learning of the first VOD file obtained from the first server 100, the controller 230 may assign the priority to the favorite video of a loyal user. The loyalty may be determined based on the number of accesses to the VOD providing server and the number of viewing times of the VOD. For example, among a drama A preferred by a user having the preset level or more in the number of accesses to the first server 100 and the number of viewing times for the VOD through the first server 100, and a drama B preferred by a user having less than the preset level in the number of accesses to the first server 100 and the number of viewing times for the VOD, the controller may specify the ranking so that the AI video learning is preferentially performed on the drama A.

In addition, according to various embodiments of the present invention, the controller 230 may further include a keyword-based VOD recommendation unit (not illustrated). The keyword-based VOD recommendation unit may be configured to perform learning a plot of the VOD and user reviews on the learned VOD file by artificial intelligence, and perform an operation of recommending the VOD file related to trend keywords recommended on the web server and the like. For example, the keyword-based VOD recommendation unit may determine a content of the title or a content featuring an actor based on the title of the drama, and the name of the actor frequently searched on the web site as a content that is popular at that point in time, and may recommend the content to the user.

Figure 4:
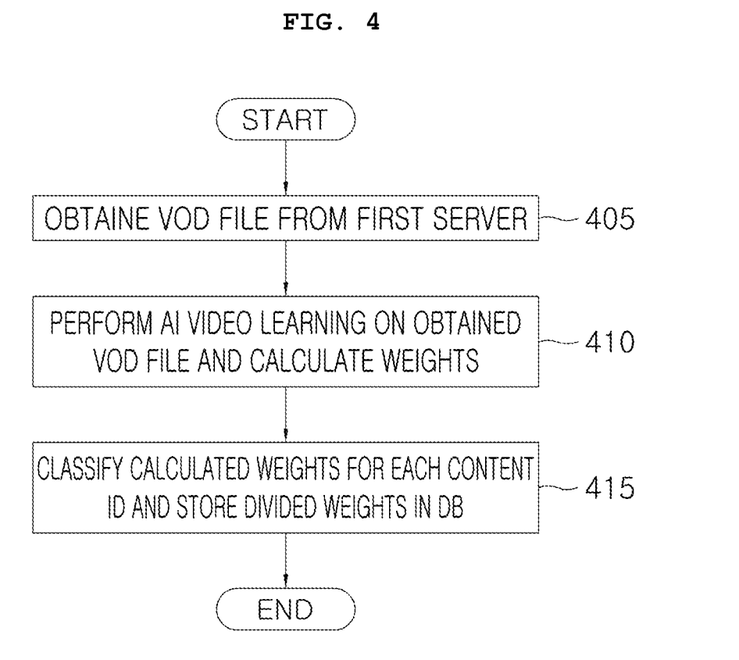
FIG. 4 is a flowchart illustrating a sequence of AI video learning operations according to the embodiment of the present invention.

FIG. 4 is a flowchart illustrating a sequence of AI video learning operations according to the embodiment of the present invention.

The second server 200 according to the embodiment of the present invention may perform an operation (405) of obtaining a VOD file from the first server. Thereafter, the second server 200 may perform an operation (410) of performing AI video learning on the obtained VOD file and calculating weights required for restoring a high image quality video. At this time, the second server 200 calculates the weights for restoring the high image quality video of the VOD file obtained through the controller 230.

Then, the controller 230 of the second server 200 may perform an operation (415) of classifying the calculated weights for each content ID and storing the divided weights in the DB 220.

The second server 200 may calculate weights for resolution restoration corresponding to the VOD files held in the first server 100 according to a sequence, and store and hold the calculated weights in a separate DB 220. The larger the size of the weight parameter, the higher the recovery rate to a high-resolution video, but it may be expected that the availability of the VOD service is decreased. Thereby, it is possible to specify the size of the calculated weight so as to be maintained in a constant capacity (e.g., less than 10 MB).

Figure 5:
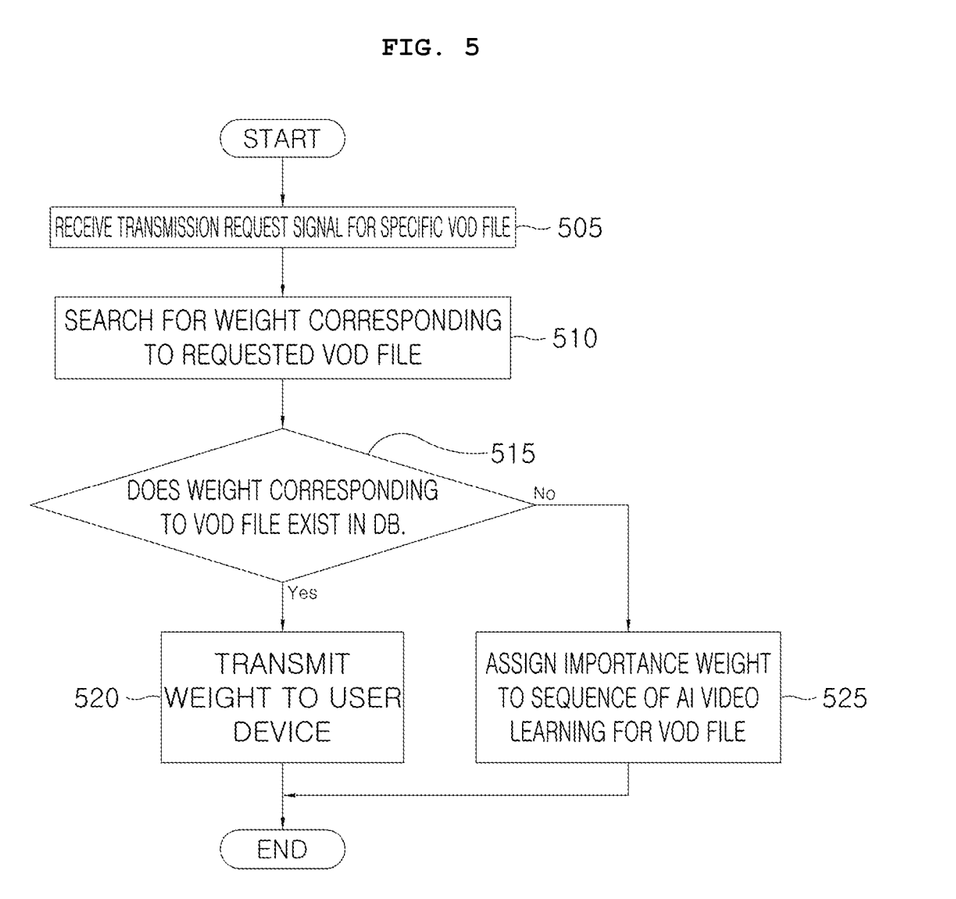
FIG. 5 is a flowchart illustrating a sequence of operations for performing restoration in the second server according to the embodiment of the present invention.

FIG. 5 is a flowchart illustrating a sequence of operations for performing restoration in the second server according to the embodiment of the present invention.

The controller 230 of the second server 200 may receive (505) a transmission request signal for a specific VOD file. At this time, the second server 200 may directly receive the transmission request signal for the specific VOD file from the user device 300. In this case, the user device 300 may be set so as to automatically receive information on the second server 200 when accessing the first server 100 providing the VOD service, and request the same signal from the second server 200 when requesting the VOD file from the first server 100.

Alternatively, when the second server 200 receives the information on the user device 300 which has accessed the VOD server from the first server, and the first server 100 receives the VOD request signal from the user device, the first server 100 may transmit the VOD request signal to the second server 200. Thereby, the second server 200 may receive the information on the VOD file requested to be transmitted and the information of the user device 300.

Then, the controller 230 of the second server 200 may perform an operation (510) of searching for the weight corresponding to the requested VOD file.

The controller 230 may perform an operation (515) of determining whether the weight corresponding to the VOD file exists in the DB. If it is determined that the weight corresponding to the VOD file exists, the controller 230 may perform an operation (520) of controlling the communication unit so as to transmit the weight to the user device 300. Meanwhile, if it is determined that the weight corresponding to the selected VOD file does not exist, the controller 230 may perform an operation (525) of assigning an importance weight to the sequence of the AI video learning for the VOD file.

The controller 230 according to the embodiment of the present invention may determine the priority for the AI video learning of the VOD file and may perform an operation of the AI video learning for the VOD file based on the set sequence information. For example, the ranking of the AI video learning performed by the controller 230 may be determined according to a score calculation method. In a case of a follow-up work (a VOD file having the same title of the work and different information on the round may be determined as a follow-up work having the same content) of the content whose existing view count is the preset reference value or more for the newly updated VOD videos, the controller 230 may assign the score based on the information on the view count of the previous VOD content. In addition, as described in the above operation (525), when there is a history of the user's request, the controller 230 may assign the weight at the time of calculating the score for determining the sequence of the AI video learning.

In addition, the controller 230 may determine the VOD content having a high degree of interest by the users according to various methods, and may control so that the AI video learning is preferentially performed on the VOD content having the high degree of interest by the users.

According to various embodiments of the present invention, the second server 200 may perform additional learning by reusing the primary learned pre-trained model (e.g., may perform additional learning in response to receiving a transmission request signal for a specific VOD file). Thereby, the operation of the AI video learning according to the embodiment of the present invention allows the learning time to be shorten.

Although not illustrated in the drawing, after the operation on the second server 200, on the user device 300, it is possible to drive the received first VOD file (a low-resolution video) and the weight corresponding to the VOD file on the AI high-resolution VOD reproduction program 301 to generate a restored high-resolution video (a second VOD file) and reproduce the same.

While the present invention has been described in detail with reference to the above-described embodiments, it should be understood by those skilled in the art that various changes, modifications, and alternations for the present embodiments may be made without departing from the spirit and scope of the invention. To sum up, it should be also understood that it is not necessary to include all functional blocks illustrated in the drawings or to follow all sequences illustrated in the drawings as the sequences illustrated in order to achieve the effects intended by the present invention, and it should be also understood that all technical ideas within the equivalent scope belong to the technical scope of the present invention described in claims.

The steps of the method or algorithm described in connection with the embodiments of the present invention may be directly implemented with hardware, may be directly implemented with software modules executed by the hardware, or may be directly implemented with a combination thereof. The software module may include a random access memory (RAM), a read only memory (ROM), an erasable programmable ROM (EPROM), an electrically erasable programmable ROM (EEPROM), a flash memory, a hard disk, a removable disk, a CD-ROM, or may reside in any form of computer readable recording medium known in the technical field to which the present invention pertains.

The components of the present invention may be implemented using software programming or software elements, and similarly, the embodiments may be implemented with any programming or scripting language such as C, C++, Java, assembler, and the like, including various algorithms being implemented with any combination of data structures, processes, routines or other programming elements. Functional aspects may be implemented in algorithms that execute on one or more processors.

The invention claimed is:

1. A video on demand (VOD) service system based on an artificial intelligence (AI) video learning platform, the system comprising:
   a first server configured to store a VOD file and provide a transmission service of the VOD file according to a request from a user device;
   a second server configured to receive the VOD file from the first server to perform AI video learning on an individual VOD file, calculate a weight corresponding to the individual VOD file as a result of the AI video learning, and transmit the calculated weight corresponding to the VOD file, which is requested in response to the request from the user device, to the user device;
   a database (DB) configured to store an ID of the VOD file learned by the second server and the weight calculated as a result of the AI video learning for the VOD file; and
   the user device configured to send a request transmission of the VOD file to the first server, receive the VOD file from the first server, receive the weight corresponding to the VOD file requested to be transmitted from the second server, and execute the VOD file to which the weight is applied,
   wherein the second server is set so that a capacity of the weight which refers to a size of a neural network model to perform the AI video learning is calculated to be 10 MB or less.

2. The system according to claim 1, wherein the AI video learning is a learning operation according to a Super Resolution Convolutional Neural Networks (SRCNNs) technique.

3. The system according to claim 1, wherein the second server is configured to:
   obtain any video file from the first server to perform the AI video learning by sampling an image area including a specific object;
   separately specify the weight calculated from the image area including the specific object as a weight for an object image; and
   when object-focused resolution restoration is selected by the user, provide the weight for the object image to the user device.

4. The system according to claim 1, wherein the second server is configured to:
   collect content information including at least one of a type, a title, a plot, and characters of contents for each VOD file;
   collect viewing information of a user and, when a viewing rate of the user is a preset reference value or more, calculate viewing preference information of the user based on the viewing information of the user and the content information; and
   recommend a VOD to the user upon updating a VOD content corresponding to the calculated viewing preference information.

5. The system according to claim 4, wherein the second server is selected so that the AI video learning is preferentially performed on a new VOD file corresponding to viewing preference information of a plurality of users.

6. A method of providing a video on demand (VOD) service in a VOD service system based on an artificial intelligence (AI) video learning platform, the method comprising:
   by a second server, receiving a VOD file from a first server and performing AI video learning on an individual VOD file, and generating and storing a weight corresponding to the individual VOD file as a result of the AI video learning;
   by the first server, receiving a transmission request for any VOD file from a user device and transmitting the VOD file to the user device;
   by the second server, receiving the transmission request for the VOD file from the first server;
   by the second server, searching for a weight corresponding to the VOD file previously stored therein, and transmitting the searched weight to the user device; and
   by the user device, receiving the VOD file transmitted from the first server and the weight transmitted from the second server, and executing an AI high-resolution VOD reproduction program with the VOD file and the weight in the user device to improve a resolution of the VOD file,
   wherein the second server is set so that a capacity of the weight which refers to a size of a neural network model to perform the AI video learning is calculated to be 10 MB or less.

* * * * *